Feb. 11, 1958    V. G. KLEIN ET AL    2,822,823
ROTARY DISK VALVE WITH RATCHET OPERATING MEANS
Filed Aug. 4, 1954    2 Sheets-Sheet 1

Victor G. Klein,
Norbert F. Cook,
Inventors.
Koenig and Pope,
Attorneys.

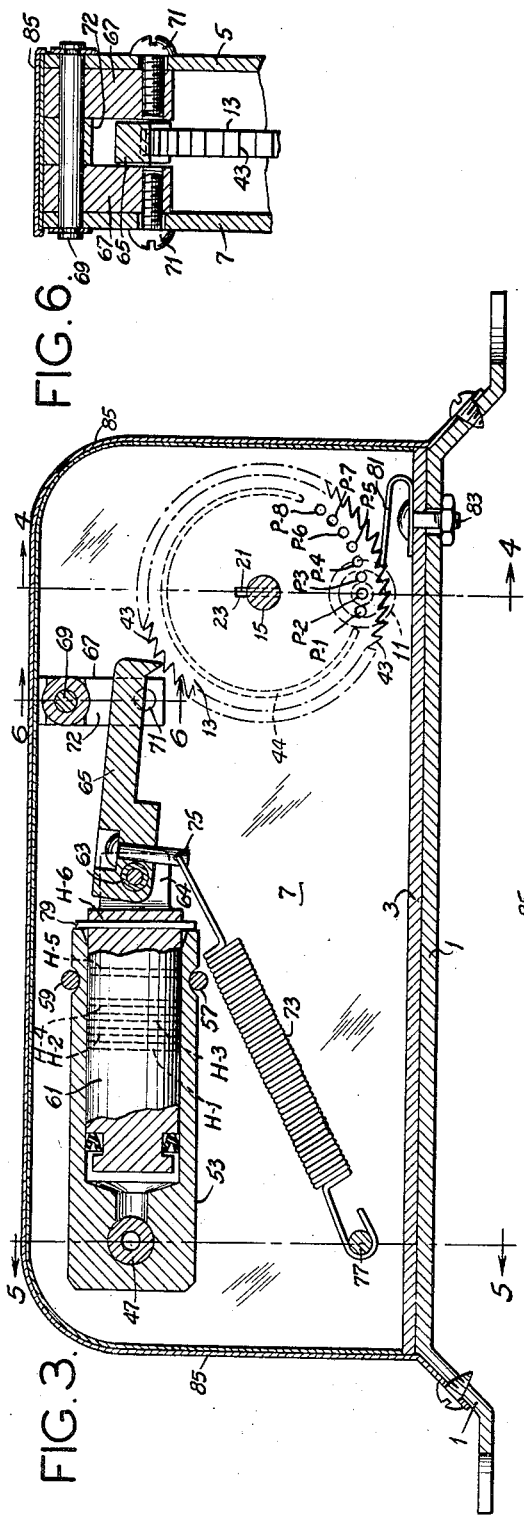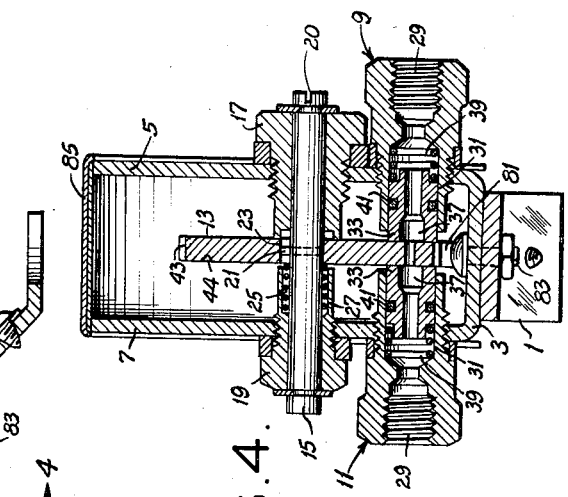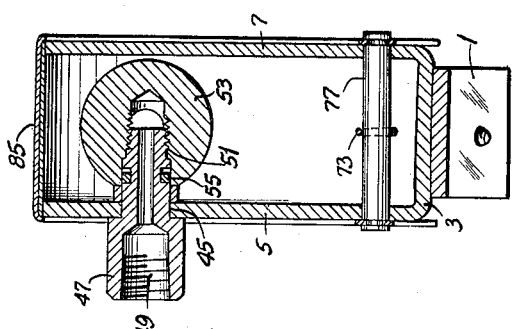

United States Patent Office 2,822,823
Patented Feb. 11, 1958

2,822,823

ROTARY DISK VALVE WITH RATCHET OPERATING MEANS

Victor G. Klein, Defiance, and Norbert F. Cook, St. Louis, Mo., assignors to The McNeil Machine & Engineering Company, Akron, Ohio, a corporation of Ohio Application August 4, 1954, Serial No. 447,861

10 Claims. (Cl. 137—625.21)

This invention relates to valves, and more particularly to a valve having a fluid-pressure-operated timing mechanism.

Among the several objects of the invention may be noted the provision of a valve having a fluid-pressure-operated timing mechanism for obtaining a single cycle of valve operation in response to a predetermined number of operations of a fluid-pressure-operated device; the provision of a valve of this class which is capable of being readily set to obtain a multiplicity of different reduction ratios, i. e., different values of the number of cycles of operation of the fluid-pressure-operated device required for one cycle of operation of the valve; and the provision of a valve of this class which is of simplified construction, economical to manufacture, and reliable in operation. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a plan view of a valve made in accordance with this invention;

Fig. 3 is a vertical longitudinal cross section of Fig. 1;

Fig. 4 is a vertical transverse cross section taken on line 4—4 of Figs. 1 and 3;

Figure 1:
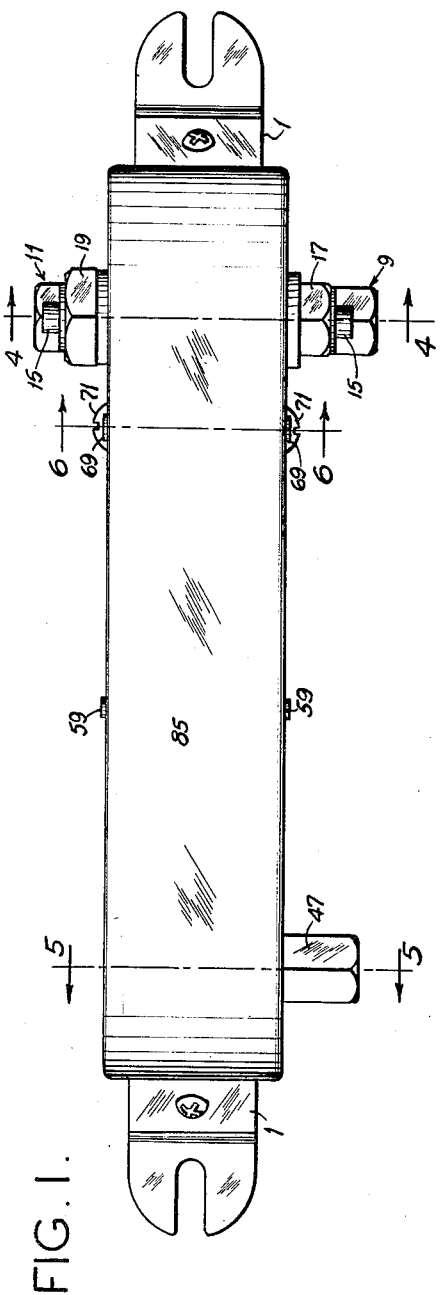
Figure 2:
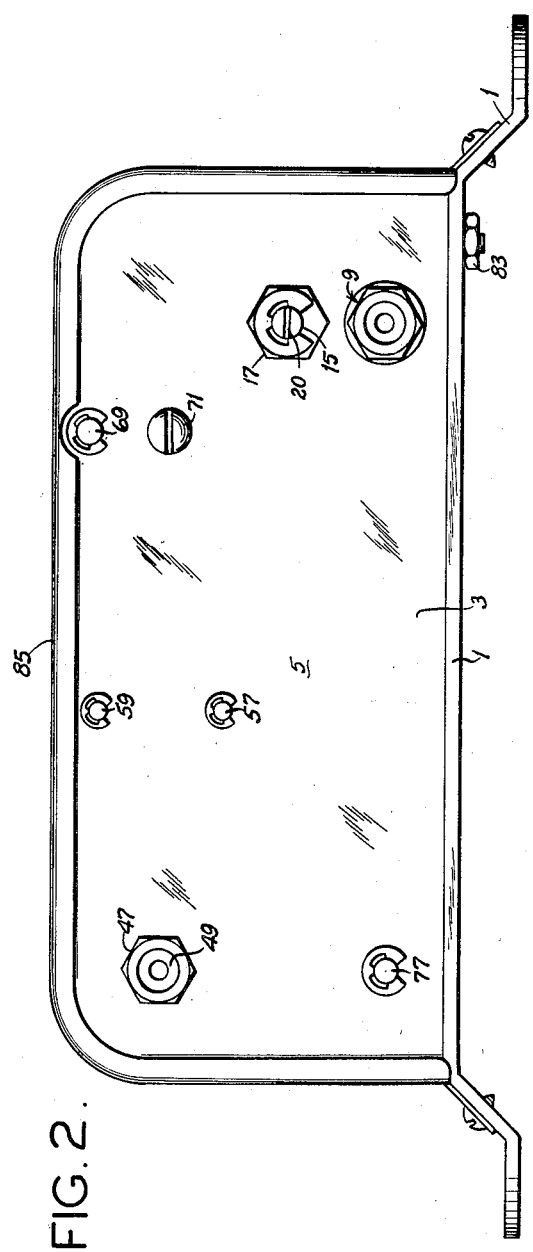
Fig. 2 is a front elevation of Fig. 1.

Fig. 5 is a vertical transverse cross section taken on line 5—5 of Figs. 1 and 3; and, Fig. 6 is a vertical transverse cross section taken on line 6—6 of Figs. 1 and 3.

Corresponding reference characters indicate corresponding parts throughout the several views of the drawings.

Referring to the drawings, a valve made in accordance with this invention, specifically for valving air, is shown to comprise a base 1 on which is mounted a U-shaped support having a bottom 3 and parallel side walls 5 and 7. An air inlet fitting 9 is fixed in an opening in the wall 5. An air outlet fitting 11 is fixed in an opening in the wall 7 in line with the inlet fitting. The inner ends of the fittings are opposed to one another and spaced apart.

At 13 is shown a valve disk. This is mounted on a shaft 15 journalled at its ends in bearings 17 and 19 threaded in openings in side walls 5 and 7. The shaft is located above and parallel to the fittings 9 and 11. It has a slot 20 at one end. The disk 13 is located between the opposed spaced-apart inner ends of the fittings 9 and 11, the axis of the fittings intersecting the disk adjacent its periphery. The disk is axially slidable on the shaft, being held against rotation relative to the shaft by a pin-type key 21 fixed in the shaft and extending into a keyway 23 in the disk. The disk is biased against the inner end of bearing 17 by a spring 25 accommodated in a recess 27 in the bearing 19.

The inlet and outlet fittings 9 and 11 are identical parts. Each has a passage 29 leading to a cylindrical recess 31 in its inner end. Slidable in this recess is a sealing member 33. The member 33 is passaged as indicated at 37 for flow of air therethrough. A spring 39 in the recess 31 biases the member 33 inward. Packing for making a sliding seal is indicated at 41. The fittings are arranged in opposed relation so that their sealing members 33 are in sealing engagement with opposite sides or faces of the valve disk 13.

The valve disk 13, as shown, is provided with a series of eight ports designated P-1 to P-8. The disk is driven to rotate clockwise as viewed in Fig. 3, as will appear, and port P-1 is the leading port in respect to this direction of rotation. Each port extends through the disk from one side or face to the other and is located at the radius of the passages 37 in sealing members 33 as measured from the axis of the shaft 15. The diameter of each port is less than the diameter of the inner ends of passages 37. The ports are equally angularly spaced. Their spacing is so related to the diameter of the inner ends of passages 37 that there may be a segment of one port, all of one port, or segments of two adjacent ports connecting the passages 37 for all positions of the disk from the position where the first port P-1 comes into intersecting relation with the inner ends of passages 37 to the position where the last port P-8 trails off the inner ends of the passages. The outside diameter of the inner ends of the sealing members 33 is such that any port which is in a position connecting the passages 37 is blocked off from atmosphere. The valve disk is formed as a ratchet disk with ratchet teeth as indicated at 43, having sixty teeth, for example. It is also formed on one face (its face toward fitting 11 as shown) with a groove 44 extending in an arc from near port P-1 to near port P-8.

The disk 13 is located toward one end of the U-shaped support (its right end as viewed in Fig. 3). Fixed in an opening 45 in the side wall 5 of the support toward its other end (and adjacent the top of the side wall) is a fitting 47 having an air passage 49. The fitting is threaded into a side opening 51 at the rearward end of an air cylinder 53. Packing 55 is provided around the fitting in opening 51. The cylinder extends from the fitting 47 toward the disk 13, and is open at its forward end. Pins 57 and 59 extend between the side walls 5 and 7 below and above the cylinder toward its forward end to hold it in position. A plunger 61 is slidable in the cylinder and extends out of the open forward end of the cylinder. Pivoted at 63 in a slot 64 in the forward end of the plunger is a pawl 65 which bears on top of the disk 13. Forward movement of the plunger is limited by engagement of its forward end with a stop 67 fixed in position between side walls 5 and 7 by means of a pin 69 and screws 71. The pawl extends through a slot 72 in the stop. A tension spring 73 is connected at one end to a stud 75 mounted in the pawl and at its other end to a pin 77 which extends between the side walls 5 and 7 below the fitting 47. Spring 73 serves the dual function of biasing the pawl downward into engagement with the disk 13, and biasing the plunger 61 rearward to a retracted position determined by engagement of a stop pin 79 with the forward end of the cylinder. The stop pin 79 is receivable in any one of a series of six axially spaced transverse holes H-1 to H-6 in the plunger 61, so that there are six different possible retracted positions of the plunger.

The plunger and pawl are movable forward upon admission of air under pressure to the cylinder 53 through the fitting 47 against the return bias of spring 73. Upon such forward movement, the pawl steps the ratchet disk 13 through a fraction of revolution depending upon the stroke of the plunger. Rotation of the ratchet disk is clockwise as viewed in Fig. 3. The stroke of the plunger is dependent upon its retracted position as determined by the setting of stop pin 79. Upon venting of air from the cylinder via fitting 47, spring 73 returns the plunger to its retracted position. Reverse rotation of the ratchet disk by the pawl upon retraction of the plunger is prevented by a leaf spring holding pawl 81 fastened on the bottom 3 of the U-shaped support by a bolt 83. Base 1 and bottom 3 are spot welded together. A cover for the U-shaped support is indicated at 85.

As previously mentioned, the ratchet disk 13 has sixty teeth. The location and spacing of pin holes H–1 to H–6 are shown as such that with the stop pin 79 in H–1, one forward stroke of the plunger steps the disk one tooth for a 60 to 1 reduction. With the stop pin in H–2, one forward stroke of the plunger steps the disk two teeth for a 30 to 1 reduction. With the stop pin in H–3, one forward stroke of the plunger steps the disk three teeth for a 20 to 1 reduction. With the stop pin in H–4, one forward stroke of the plunger steps the disk four teeth for a 15 to 1 reduction. With the stop pin in H–5, one forward stroke of the plunger steps the disk six teeth for a 10 to 1 reduction. With the stop pin in H–6, one forward stroke of the plunger steps the disk ten teeth for a 6 to 1 reduction.

The valve is particularly useful for obtaining operation of a piston-type air motor, for example, in response to a predetermined number of operations of an air-pressure-operated device. For example, it is especially suitable for use on a vehicle having air brakes for obtaining operation of an air motor for driving a lubricant injector in response to a predetermined number of operations of the air brakes. For this purpose, a connection is made from the air brake system to the inlet 47 so that plunger 61 is driven forward each time the brakes are applied, and released upon release of the brakes. A connection is made from the source of compressed air on the vehicle to the inlet fitting 9, and a connection is made from the outlet fitting 11 to the air motor for operating the injector. Assuming that it is desired to operate the injector upon every six applications of the brakes, the stop pin 79 is located in hole H–6 as shown in Fig. 3 for a 6 to 1 reduction. Fig. 3 shows the plunger 61 in retracted position. Upon application of the brakes and admission of air under pressure to cylinder 53 via fitting 47, the plunger 61 is driven forward against the bias of spring 73 to the point where its forward end engages stop 67. This drives the pawl 65 forward a distance such as to step the disk 13 forward ten teeth (60°). Upon release of the brakes and venting of the cylinder, the plunger is returned to its retracted position. Six such cycles of operation of the plunger are required to rotate the disk through a complete revolution. The angle between the leading edge of the first port P–1 and the trailing edge of the last port P–8 is greater than 60°. Accordingly, once during each revolution of the disk, the disk will be at rest for an interval between successive applications of the brakes with a segment of one port, or all of one port, or segments of two adjacent ports connecting the passages 37 for flow of air from the inlet fitting 9 to the outlet fitting 11 to effect operation of the motor for driving the injector. Whether the flow is via a segment of one port, or all of one port or segments of two ports, depends on the angular position of the disk relative to the axis of the fittings, and any one of these three flow conditions is equally effective for operating the injector motor. During the portion of the revolution of the disk in which the groove 44 is open to the inner end of the passage 37 in the outlet fitting 11, the passage 37 is vented to atmosphere to vent the injector motor.

The reduction ratio may be changed by changing the position of the stop pin 79 as previously described. For example, pin 79 may be located in hole H–1 for a 60 to 1 reduction. In this case, each application of the brakes effects stepping of the valve disk one tooth. During that fraction of the revolution of the disk from the position where the first port P–1 comes into intersecting relation with the inner ends of passages 37 to the position where the last port P–8 trails off the inner ends of the passages, the inlet fitting 9 will be connected to the outlet fitting 11 via a segment of one port, or all of one port, or segments of two adjacent ports, for supplying air under pressure to the injector motor. During the remainder of a revolution, the passage 37 in the outlet fitting 11 will be vented to atmosphere via the groove 44. Operation for other reduction ratios will be readily understood. The provision of the ports P–1 to P–8 as described eliminates any possibility of missing a cycle of operation and insures that there will be one cycle of operation of the disk no matter what the injector motor per revolution of the disk no matter what the reduction ratio is selected and no matter what the position of the disk may be at the start of operations.

If it should be desired to cycle the injector motor manually at any time, the valve disk may be turned by turning shaft 15 with a screw driver applied in the slot 20.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A valve comprising a support, a ratchet disk rotary on the support, aligned valve fittings fixed on the support in engagement with opposite faces of the disk on a radius from the axis of the disk, the disk having a series of ports extending therethrough from one face to the other on the radius of the fittings for establishing communication from one fitting to the other in various rotary positions of the disk, a cylinder fixed on the support closed at one end constituting its rearward end and open at its forward end, a plunger slidable in the cylinder and extending out of its forward end, the cylinder having a port for admitting fluid under pressure rearward of the plunger to drive the plunger forward and for venting the cylinder of said fluid to allow the plunger to move rearward, a pawl pivoted on the forward end of the plunger for rotating the ratchet disk in one direction, means biasing the plunger rearward, a stop on the support engageable by the plunger for limiting its forward movement, and means positionable at different locations on the plunger engageable with the forward end of the cylinder for determining different retracted positions of the plunger thereby to change its stroke.

2. A valve comprising a support, a ratchet disk rotary on the support, aligned valve fittings fixed on the support in engagement with opposite faces of the disk on a radius from the axis of the disk, the disk having a series of ports extending therethrough from one face to the other on the radius of the fittings for establishing communication from one fitting to the other in various rotary positions of the disk, a cylinder fixed on the support closed at one end constituting its rearward end and open at its forward end, a plunger slidable in the cylinder and extending out of its forward end, the cylinder having a port for admitting fluid under pressure rearward of the plunger to drive the plunger forward and for venting the cylinder of said fluid to allow the plunger to move rearward, a pawl pivoted on the forward end of the plunger for rotating the ratchet disk in one direction, means biasing the plunger rearward, a stop on the support engageable by the plunger for limiting its forward movement, the plunger having a series of axially spaced lateral holes and a pin removably received in one of said holes, said pin being engageable with the forward end of the cylinder to determine a retracted position of the plunger, the pin being receivable in any other of the holes for determining different retracted positions of the plunger thereby to change its stroke, the arrangement being such that when the pin is in the forward one of the holes the stroke of the plunger is a maximum and the disk is rotated through a maximum fraction of a revolution upon each operation of the plunger, and when the pin is in the rearward one of the holes, the stroke of the plunger is a minimum and the disk is rotated through a minimum fraction of a revolution upon each operation of the plunger.

3. A valve as set forth in claim 2 wherein the means biasing the plunger rearward comprises a spring connected between the support and the pawl and acting to bias the pawl into engagement with the ratchet disk as well as biasing the plunger rearward.

4. A valve as set forth in claim 2 wherein the disk has a groove in one face thereof extending in an arc from near the first port to near the last port, the arc having a radius corresponding to the radius of the fittings from the axis of the disk.

5. A valve comprising a support, a ratchet disk rotary on the support, aligned valve fittings fixed on the support having passaged sealing members in engagement with opposite faces of the disk on a radius from the axis of the disk, the disk having a series of ports extending therethrough from one face to the other on the radius of the fittings for establishing communication from the passage in the sealing member of one fitting to the passage in the sealing member of the other in various rotary positions of the disk, the diameter of each port being less than the diameter of the inner ends of the passages and the spacing of the ports being so related to the diameter of the inner ends of the passages that there may be a segment of one port, all of one port, or segments of two adjacent ports connecting the passages for all positions of the disk from the position where the first port of the series comes into intersecting relation with the inner ends of the passages to the position where the last port of the series trails off the inner ends of the passages, a cylinder fixed on the support closed at one end constituting its rearward end and open at its forward end, a plunger slidable in the cylinder and extending out of its forward end, the cylinder having a port for admitting fluid under pressure rearward of the plunger to drive the plunger forward and for venting the cylinder of said fluid to allow the plunger to move rearward, a pawl pivoted on the forward end of the plunger for rotating the ratchet disk in one direction, means biasing the plunger rearward, and means for varying the stroke of the plunger.

6. A valve as set forth in claim 5 wherein the means biasing the plunger rearward comprises a spring connected between the support and the pawl and acting to bias the pawl into engagement with the ratchet disk as well as biasing the plunger rearward.

7. A valve as set forth in claim 5 wherein the means for varying the stroke of the plunger comprises a stop on the support engageable by the plunger for limiting its forward movement, and means positionable at different locations on the plunger engageable with the forward end of the cylinder for determining different retracted positions of the plunger.

8. A valve comprising a support, a ratchet disk rotary on the support, aligned valve fittings fixed on the support having passaged sealing members in engagement with opposite sides of the disk on a radius from the axis of the disk, the disk having a series of ports extending therethrough from one side to the other for establishing communication from the passage in the sealing member of one fitting to the passage in the sealing member of the other in various rotary positions of the disk, the diameter of each port being less than the diameter of the inner ends of the passages and the spacing of the ports being so related to the diameter of the inner ends of the passages that there may be a segment of one port, all of one port, or segments of two adjacent ports connecting the passages for all positions of the disk from the position where the first port of the series comes into intersecting relation with the inner ends of the passaegs to the position where the last port of the series trails off the inner ends of the passages, a cylinder fixed on the support closed at one end constituting its rearward end and open at its forward end, a plunger slidable in the cylinder and extending out of its forward end, the cylinder having a port for admitting fluid under pressure rearward of the plunger to drive the plunger forward and for venting the cylinder of said fluid to allow the plunger to move rearward, a pawl pivoted on the forward end of the plunger for rotating the ratchet disk in one direction, means biasing the plunger rearward, a stop on the support engageable by the plunger for limting its forward movement, the plunger having a series of axially spaced lateral holes and a pin removably received in one of said holes, said pin being engageable with the forward end of the cylinder to determine a retracted position of the plunger, the pin being receivable in any other of the holes for determining different retracted positions of the plunger thereby to change its stroke, the arrangement being such that when the pin is in the forward one of the holes the stroke of the plunger is a maximum and the ratchet disk is rotated through a maximum fraction of a revolution upon each operation of the plunger, and when the pin is in the rearward one of the holes, the stroke of the plunger is a minimum and the ratchet disk is rotated through a minimum fraction of a revolution upon each operation of the plunger, the angle along the series of ports in the ratchet disk measured from the leading edge portion of the first port of the series to the trailing edge portion of the last port being greater than the angle corresponding to said maximum fraction.

9. A valve as set forth in claim 8 wherein the means biasing the plunger rearward comprises a spring connected between the support and the pawl and acting to bias the pawl into engagement with the ratchet disk as well as biasing the plunger rearward.

10. A valve as set forth in claim 8 wherein the disk has a groove in one face thereof extending in an arc from near the first port to near the last port, the arc having a radius corresponding to the radius of the fittings from the axis of the disk.

References Cited in the file of this patent
UNITED STATES PATENTS

| | | |
|---|---|---|
| 615,717 | Knapp | Dec. 13, 1898 |
| 1,290,640 | Mulligan | Jan. 7, 1919 |
| 1,607,827 | Herrmann | Nov. 23, 1926 |
| 1,842,382 | Arey | Jan. 26, 1932 |
| 1,930,902 | Meachem | Oct. 17, 1933 |
| 2,677,391 | Chellberg | May 4, 1954 |